US008465358B2

(12) United States Patent
Kemper

(10) Patent No.: US 8,465,358 B2

(45) Date of Patent: Jun. 18, 2013

(54) VIDEO SLOT GAMING MACHINE

(75) Inventor: Roger Kemper, Henderson, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 442 days.

(21) Appl. No.: 12/859,550

(22) Filed: Aug. 19, 2010

(65) Prior Publication Data

US 2012/0046089 A1 Feb. 23, 2012

(51) Int. Cl.
*A63F 13/00* (2006.01)

(52) U.S. Cl.
USPC .............................................. 463/20; 463/16

(58) Field of Classification Search
USPC .................................................... 463/16, 20
See application file for complete search history.

(56) References Cited

U.S. PATENT DOCUMENTS 7,704,141 B1 * 4/2010 Marks et al. .................... 463/20
8,105,145 B2 * 1/2012 Jaffe ................................ 463/16
8,257,161 B2 * 9/2012 Louie et al. ...................... 463/20
2002/0198039 A1 12/2002 Marks et al.
2003/0064779 A1 4/2003 Suda
2005/0020349 A1 1/2005 Tachikawa
2008/0058083 A1 3/2008 Saito
2009/0104972 A1 4/2009 Itagaki et al.
2009/0170588 A1 7/2009 Baerlocher
2009/0286588 A1 11/2009 Jackson

FOREIGN PATENT DOCUMENTS

WO 03/030116 A1 4/2003

OTHER PUBLICATIONS

Corresponding Australian Application—Examiner's 1st Report dated Nov. 11, 2010.

* cited by examiner

*Primary Examiner* — James S McClellan

(74) *Attorney, Agent, or Firm* — Howard & Howard Attorneys PLLC

(57) ABSTRACT

A gaming machine and method are provided which provide a slot game to a player. The slot game includes a plurality of cells arranged in a grid. The grid has a plurality of rows and columns. The game is played and an initial outcome is established and any payouts based on a winning outcome are paid. If a catalyst symbol appears in the initial outcome, any reactant symbols which appear in the outcome in a predetermined relationship with the catalyst symbol may be changed into a resultant symbol which is treated as wild. The resultant symbols and the other symbols form a secondary outcome. The player may be awarded an award or payout based on the secondary outcome.

28 Claims, 8 Drawing Sheets

VIDEO SLOT GAMING MACHINE

FIELD OF THE INVENTION

The present invention relates generally to video gaming machines and more particularly, to an apparatus and method for playing a video slot machine which includes a catalyst symbol which affects and modifies specific other symbol(s) in other cells according to a predetermined set of rules.

BACKGROUND OF THE INVENTION

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability.

The present invention is directed to satisfying these needs.

SUMMARY OF THE INVENTION

In a first aspect of the present invention, a method provides a slot game to a player. The slot game has a plurality of cells arranged in a grid having a plurality of rows and columns. The method includes the steps of allowing the player to make a wager, displaying the slot game on a display device, and randomly selecting an outcome of the slot machine and displaying the outcome on the display device. The outcome of the slot game includes a game symbol associated with each cell in the grid. The game symbols belong to a predetermined set of game symbols which includes a catalyst symbol and a reactant symbol. The method also includes the steps of awarding an award to the player as a function of the outcome of the slot game, the wager made by the player, and a predetermined paytable and detecting an occurrence of the catalyst symbol in the outcome of the slot game and responsively detecting an occurrence of a reactant symbol being in one of the cells of the grid having a predetermined relationship with the catalyst symbol and modifying the reactant symbol into a resultant symbol. For each resultant symbol an occurrence of a reactant symbol having a predetermined relationship with the resultant symbol is detected and the reactant symbol is responsively modified into a resultant symbol. The catalyst symbol and any resultant symbol(s) form a revised outcome of the slot game. The method further includes the step of awarding an award to the player as a function of the revised outcome of the slot game and a second predetermined paytable.

In a second aspect of the present invention, a method provides a slot game to a player. The slot game has a plurality of cells arranged in a grid having a plurality of rows and columns. The method includes the steps of allowing the player to make a wager, displaying the slot game on a display device, and randomly selecting an outcome of the slot machine and displaying the outcome on the display device. The outcome of the slot game includes a game symbol associated with each cell in the grid. The game symbols belong to a predetermined set of game symbols which includes a first catalyst symbol, a first reactant symbol, a second catalyst symbol, and a second reactant symbol. The method further includes the steps awarding an award to the player as a function of the outcome of the slot game, the wager made by the player, and a predetermined paytable, detecting an occurrence of the first and second catalyst symbols being adjacent in the outcome of the slot game and responsively: randomly choosing one of the first and second catalyst symbols as a winning catalyst symbol and detecting an occurrence of the associated reactant symbol being in one of the cells of the grid having a predetermined relationship with the winning catalyst symbol and modifying the associated reactant symbol into a winning resultant symbol. For each winning resultant symbol, the method includes the step of detecting an occurrence of an associated reactant symbol having a predetermined relationship with the winning resultant symbol and modifying the associated reactant symbol into a winning resultant symbol, the winning catalyst symbol and any winning resultant symbol(s) forming a revised outcome of the slot game. The method further includes the step of awarding an award to the player as a function of the revised outcome of the slot game and a second predetermined paytable.

In a third aspect of the present invention a gaming machine provides a slot game to a player. The slot game has a plurality of cells arranged in a grid having a plurality of rows and columns. The gaming machine includes a display device and a game controller. The game controller allows the player to make a wager, displays the slot game on a display device, randomly selects an outcome of the slot machine and displays the result on the display device, and awards an award to the player as a function of the outcome of the slot game, the wager made by the player, and a predetermined paytable. The outcome of the slot game includes a game symbol associated with each cell in the grid. The game symbols belong to a predetermined set of game symbols which includes a catalyst symbol and a reactant symbol. The game controller detects an occurrence of the catalyst symbol in the outcome of the slot game and responsively detects an occurrence of a reactant symbol being in one of the cells of the grid having a predetermined relationship with the catalyst symbol and modifies the reactant symbol into a resultant symbol. For each resultant symbol, the game controller detects an occurrence of a reactant symbol having a predetermined relationship with the resultant symbol and modifies the reactant symbol into a resultant symbol. The catalyst symbol and any resultant symbol(s) form a revised outcome of the slot game. The game controller awards an award to the player as a function of the revised outcome of the slot game and a second predetermined paytable.

In a fourth aspect of the present invention, a gaming machine provides a slot game to a player. The slot game has a plurality of cells arranged in a grid having a plurality of rows and columns. The gaming machine has a display device and a game controller. The game controller allows the player to make a wager, displays the slot game on a display device, randomly selects an outcome of the slot machine and displays the result on the display device, and awards an award to the player as a function of the outcome of the slot game, the wager made by the player, and a predetermined paytable. The outcome of the slot game includes a game symbol associated with each cell in the grid. The game symbols belong to a predetermined set of game symbols which includes a first catalyst symbol, a first reactant symbol, a second catalyst symbol, and a second reactant symbol. The game controller detects an occurrence of the first and second catalyst symbols being adjacent in the outcome of the slot game and responsively: randomly chooses one of the first and second catalyst symbols as a winning catalyst symbol, detects an occurrence of the associated reactant symbol being in one of the cells of the grid having a predetermined relationship with the winning catalyst symbol and modifies the associated reactant symbol into a winning resultant symbol. For each winning resultant symbol, the game controller detects an occurrence of an associated reactant symbol having a predetermined relationship with the winning resultant symbol and modifying the associated reactant symbol into a winning resultant symbol, the winning catalyst symbol and any winning resultant symbol(s) forming a revised outcome of the slot game and awarding an award to the player as a function of the revised outcome of the slot game and a second predetermined paytable.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

With reference to the drawings and in operation, the present invention provides a slot gaming machine 10. The slot gaming machine 10 provides a slot game, the slot game may be a video slot game or a stepper motor slot game. For the purposes of illustration and example only and without limitation, the present invention will be described with respect to a video slot game.

In general, the gaming machine 10 displays, and allows a player to play a video slot game and, if and when, a catalyst symbol appears, modifies one or more reactant symbols if the reactant symbol has a predetermined relationship with catalyst symbol (see below).

Figure 1:
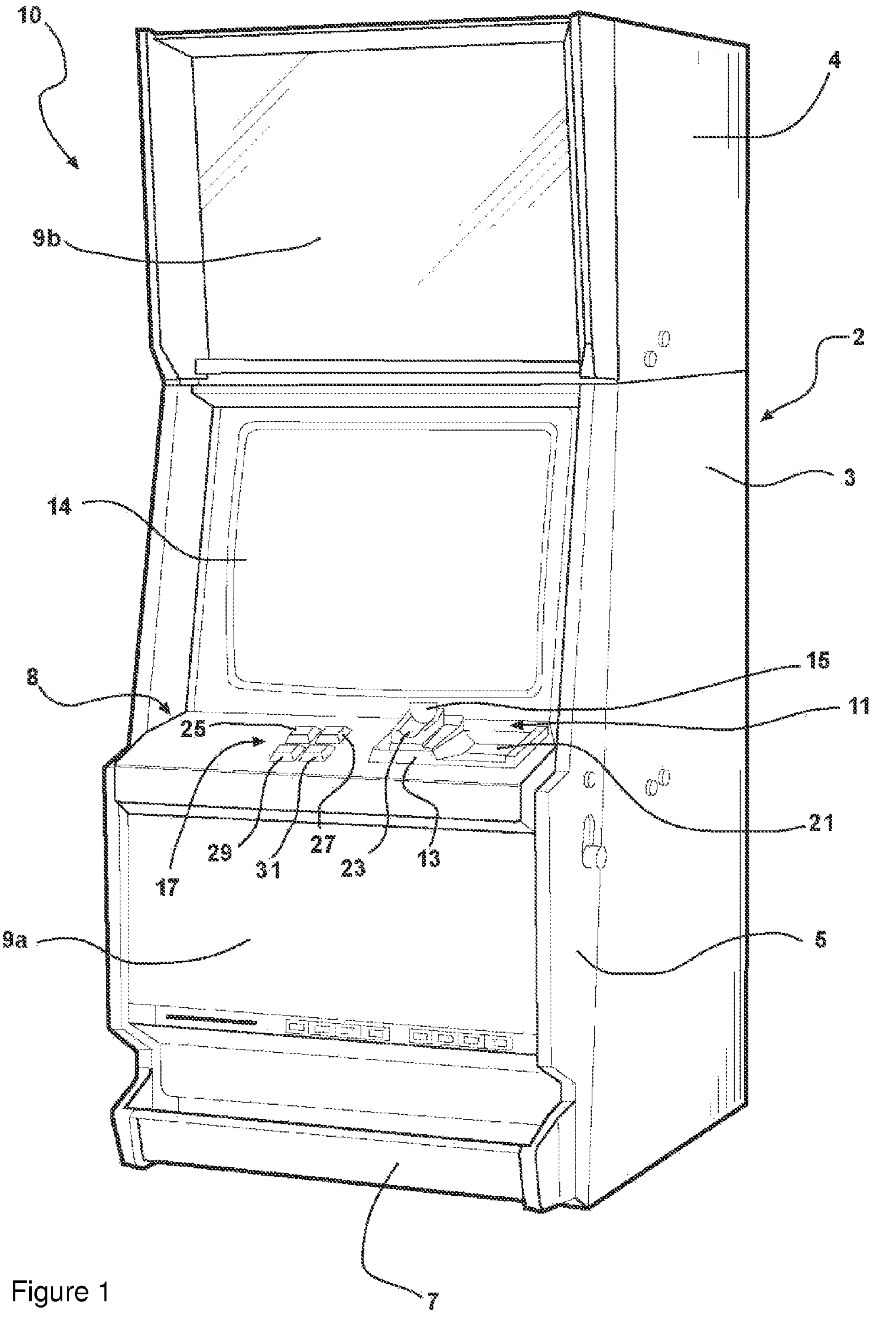
FIG. 1 is a perspective view of a gaming machine.

With specific reference to FIG. 1, an exemplary video gaming machine 10 is illustrated into which the present invention can be incorporated to improve the enjoyment of a video game and to thereby increase the amount of time that the video game is played by patrons of a gaming establishment. FIG. 1 shows a general appearance of the video gaming machine 10 to which the present invention is applied. As shown in the FIG. 1, the machine 10 comprises a housing 2 standing upright. The housing 2 comprises a main body 3, a top box 4 mounted on a top portion of the main body 3 and a door 5 attached to a front side of the main body 3 so as to be swingable between an open position and a close position.

At a center portion of the front side of the main body 3, there is mounted a main display device or display 14 comprising a CRT, and below the display 14 is provided an operation panel 8. The operation panel 8 is attached to the door 5 so as to slope down in a forward direction of the machine 10. Below the operation panel 8 and on a front side of the top box 4, there are provided decoration panels 9*a* and 9*b* on which pictures, letters and the like representing a title of the machine 10 or the like are illustrated.

As shown in FIG. 1, the operation panel 8 is provided, from a right end toward a left end thereof, with an insertion portion 11, and an input portion 17. The insertion portion 11 is provided with a slot base 13 integrally formed with a coin insertion portion 15 and a bill insertion portion 21.

The input portion 17 is provided with four push button switches 25, 27, 29, 31 as first input devices, each of which is capable of being depressed. These push button switches 25, 27, 29, 31 are selected as switches to be operated with particular high frequency during the game, so that these switches are provided on the operation panel 8. For example, the push button switch 29 at a lower left position of the four switches is operated for starting the game. The number of the push buttons provided at the input portion 17 and functions assigned to the push buttons can be properly changed.

Figure 2:
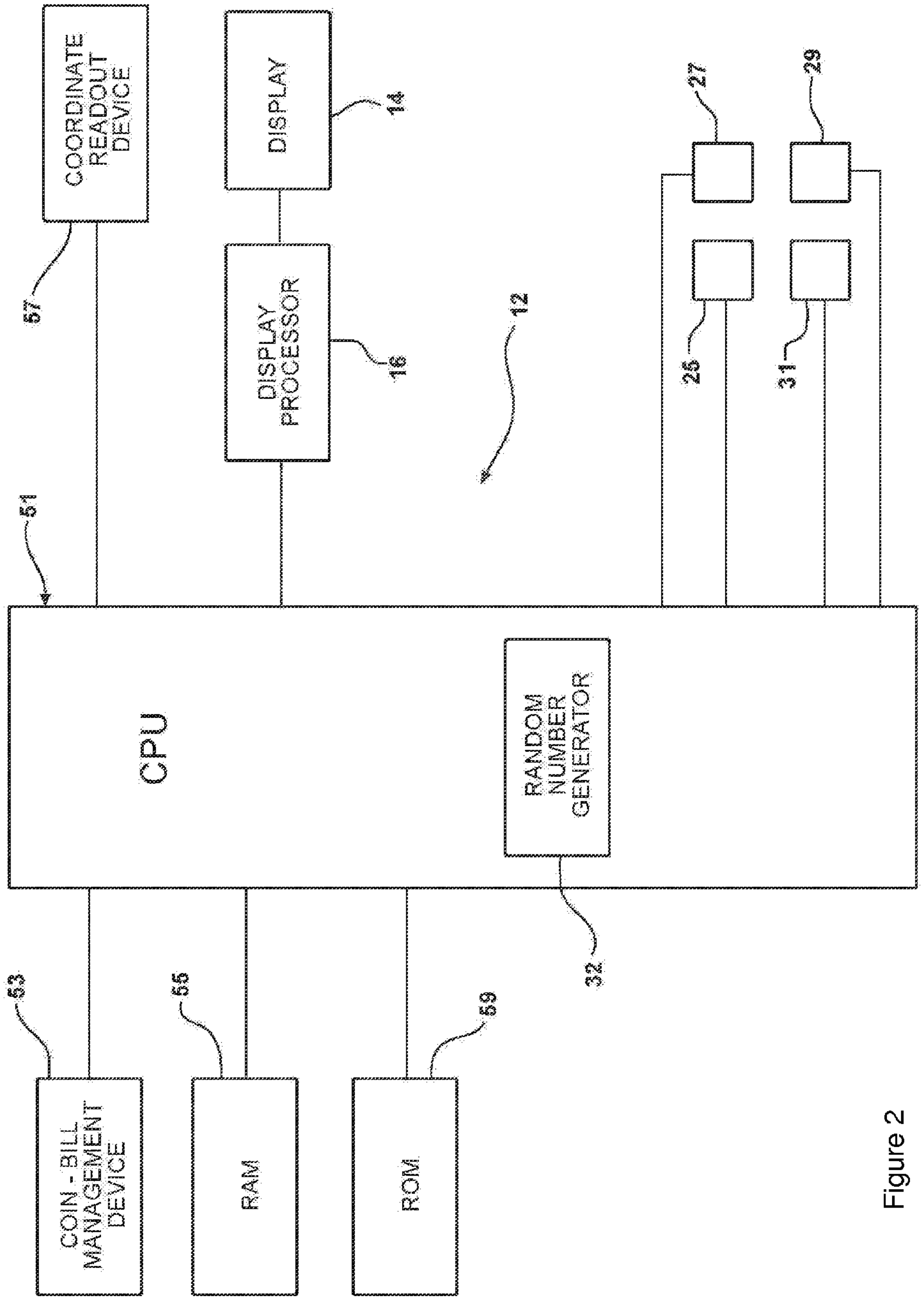
FIG. 2 is a schematic representation of the video gaming machine of the present invention.

Referring now to FIG. 2, a block diagram illustrating a schematic configuration of a control system provided in the machine 10 is depicted, according to one embodiment of the present invention. The machine 10 includes a game controller 12. The game controller 12 includes a central processing unit (CPU) 51, a coin-bill management device 53, a display processor 16, RAM 55 as a memory device and EPROM 59. The CPU 51 is mainly composed of a microprocessor unit and performs various calculations and motion control necessary for the progress of the game.

The coin-bill management device 53 detects the insertion of a coin and a bill from the coin insertion portion 15 and the bill insertion portion 21, and performs a necessary process for managing coins and bills. The display processor 16 interprets commands issued from the CPU 51 and displays desirable images on the display 14. The RAM 55 temporary stores programs and data necessary for the progress of the game, and the EPROM 59 stores, in advance, programs and data for controlling basic operation of the machine 10, such as the booting operation thereof.

The video gaming machine 10 of FIG. 1 further includes the display 14 that displays a video slot game and a player using the video gaming machine 10 interacts with the game.

The CPU 51 is electrically connected with a coordinate readout device 57 as well as the above mentioned pushbutton switches 25, 27, 29, 31. The coordinate readout device 57 works as a second input device and comprises, for example, a so-called touch panel formed as a transparent panel on the display 14 and capable of issuing signals corresponding to the coordinates of a position touched on the display 14 by the player. The coordinate readout device 57 is closely put on the surface of the display 14 and integrated therewith. In the CPU 51, there are provided a payment processor (not shown) for counting value of money consumed in each game. A random number generator 32 is included for randomly generating numbers during play of the game, as described below.

Figure 3:
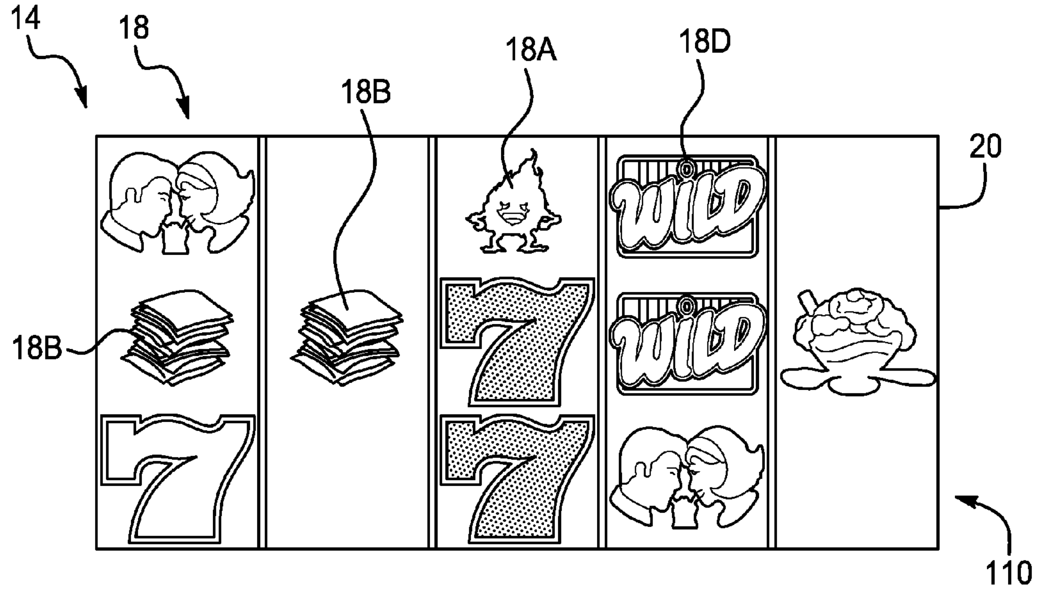
FIG. 3 is an exemplary screenshot of a video slot game, according to a first embodiment of the present invention.

With reference to FIGS. 1 and 3, the game controller 51 sends a signal to a display processor 16 for displaying a plurality of game elements 18 on the display 14. The display includes a cash-out touchpad 41 such that when the cash-out touchpad 41 is touched any accumulated credits are paid to the player in a coin bin 7. A winner paid meter (not shown) keeps track of credits paid out to a player. A credit meter (not shown) is displayed for informing the player of the number of winning credits won on a given spin. The touchpad could also be buttons affixed to the machine.

The display 14 further includes a help touchpad (not shown) for accessing information about the game. A credit meter (not shown) displays to the player a number of credits available to the player for game play or cash-out. A select lines touchpad (not shown) allows the player to toggle through and select the available sets of paylines. Preferably, the video slot gaming machine 10 is a multi-line game, i.e., the paylines include horizontal paylines and/or diagonal paylines, and/or zig-zag paylines. A bet per line touchpad (not shown) allows the player to toggle to increase the bet per line a credit at a time (up to the maximum bet).

Returning to FIG. 2, the payment processor (not shown) is connected to the game controller 12 for awarding a regular payout in response to the game elements 18 displayed on the display 14 matching a winning combination along one of the paylines selected by the player.

With reference to FIG. 3, in one aspect of the present invention, the game controller 12, the display device or display 14 is adapted to display the plurality of game elements 18 in a grid 20 having a plurality of cells defined by rows and columns. During play of the video slot game, the game controller 12 randomly selects the game elements 18 to be displayed in the display device 14. The selected game elements 18 are selected from a set of possible game elements. The game controller 12 is adapted to determine an outcome of the regular game based on the displayed game elements 18, the pay-table, a wager, and predetermined paylines.

It should be noted that the above described gaming machine 12 is for exemplary purposes only. The present invention is not limited to any particular gaming machine. The gaming machine 12 may also include other features. For example, the gaming machine 12 may include a player tracking device (not shown) which is connected to a player tracking system. The gaming machine 12 may also utilize a cashless wagering system (not shown), such as a ticket in ticket out (TITO) system (not shown). Additionally, although the illustrated example (described below), has 5 columns or reels with 3 cells per reel, other arrangements may be used, including slot games having reels with different number of cells, such as 4-5-5-5-4, 3-4-3-4-3, or 4-5-4-5-4 configurations.

With particular reference to FIGS. 3-13B, the game controller 12 displays the video slot game 110 on the display 14. The video slot game 110 is played using a plurality of cells arranged in a grid 20 having a plurality of rows and columns. The video slot game 110 is generally first played in a conventional manner. The player makes a wager, typically based on a predetermined denomination and a selected number of paylines. The reels are spun and game symbols or elements are randomly chosen for each cell. If a predetermined pattern of elements are randomly chosen for each cell on a played payline, the player is awarded a payout based on the payline, the wager, and a predetermined paytable. Many variations to the above described general play of a video slot game fall within the scope of the present invention. Such a video slot game 110 is well-known in the art, and is therefore not further discussed.

In one embodiment of the present invention, the game controller 51 allows the player to make a wager, displays the slot game 110 on the display device 14, randomly selects an outcome of the slot game 110 and displays the result on the display device 14, and awards an award to the player as a function of the outcome of the slot game 110, the wager made by the player, and a predetermined paytable. The outcome of the slot game 110 includes a game symbol associated with each cell in the grid 20. The game symbols belong to a predetermined set of game symbols which includes a catalyst symbol 18A, 20A and a reactant symbol 18B, 18D, 18F, 20B (see below). The game controller 51 detects an occurrence of the catalyst symbol 18A, 20A in the outcome of the slot game 110 and responsively detects an occurrence of a reactant symbol 18B, 18D, 18F, 20B being in one of the cells of the grid 20 having a predetermined relationship with the catalyst symbol 18A, 20A and modifies the reactant symbol 18B, 18D, 18F, 20B into a resultant symbol 18C, 18E, 18G, 20C. For each resultant symbol, the game controller detects an occurrence of a reactant symbol having a predetermined relationship with the resultant symbol and modifies the reactant symbol into a resultant symbol. The catalyst symbol 18A, 20A and any resultant symbol(s) form a revised outcome of the slot game. The game controller awards an award to the player as a function of the revised outcome of the slot game and a second predetermined paytable. It should be noted throughout the specification that the various paytables discussed herein, could be the same paytables or could be different. Thus, the second predetermined paytable could be the same or different as the predetermined paytable.

In another embodiment of the present invention, the game controller 51 allows the player to make a wager, displays the slot game 110 on a display device 14, randomly selects an outcome of the slot game 110, displays the result on the display device 14, and awards an award to the player as a function of the outcome of the slot game 110, the wager made by the player, and a predetermined paytable. The outcome of the slot game 110 includes a game symbol 18 associated with each cell in the grid 20. The game symbols belong to a predetermined set of game symbols which includes a first catalyst symbol 18A, a first reactant symbol 18B, 18D, 18F, a second catalyst symbol 20A, and a second reactant symbol 20B. The game controller 51 detects an occurrence of the first and second catalyst symbols 18A, 20A being adjacent in the outcome of the slot game 110 and responsively: randomly chooses one of the first and second catalyst symbols 18A, 20A as a winning catalyst symbol 18A, 20A, detects an occurrence of the associated reactant symbol 18B, 18D, 18F, 20B being in one of the cells of the grid 20 having a predetermined relationship with the winning catalyst symbol 18A, 20A and modifies the associated reactant symbol 18B, 18D, 18F, 20B into a winning resultant symbol 18C, 18E, 18G 20C. For each winning resultant symbol 18C, 18E, 18G 20C, the game controller 51 detects an occurrence of an reactant symbol 18B, 18D, 18F, 20B having a predetermined relationship with the winning resultant symbol 18C, 18E, 20C and modifies the associated reactant symbol 18B, 18D, 18F, 20B into a winning resultant symbol 18B, 18D, 18G, 20C, the winning catalyst symbol 18A, 20A and any winning resultant symbol (s) 18B, 18D, 18G, 20C forming a revised outcome of the slot game 110 and awarding an award to the player as a function of the revised outcome of the slot game 110 and a second predetermined paytable.

In another aspect of the present invention, a method of providing a slot game to a player is provided. In a first step, the player is allowed to make a wager on the slot game. With specific reference to FIG. 3, the slot game 110 is displayed on the display device 14 (second step). In a third step, an outcome of the slot game is randomly determined and the outcome is displayed on the display device 14. As shown in FIG. 3, the outcome of the slot game includes a game symbol 18 associated with each cell in the grid 20. The game symbols belong to a predetermined set of game symbols which includes a catalyst symbol 18A and a reactant symbol 18B.

If the outcome includes a winning outcome, per the slot game's paytable, an award is awarded or paid to the player. The award is typically determined as a function of the outcome of the slot game, the wager made by the player, and a predetermined paytable.

In one embodiment, the catalyst symbol 18A only appears under certain conditions, for example, a near miss or almost win in the outcome of the slot game. In another embodiment, the catalyst symbol 18A may appear at any time, including in a winning outcome of the slot game. In the latter embodiment, the following steps following the appearance of the catalyst symbol 18A may result in an additional payout, which could be added to the first payout and paid in a single award or the original payout and the additional payout could be paid in separate awards.

In the illustrated embodiment, the catalyst symbol 18A is a flame character symbol, but it should be noted that the slot game of the present invention could use any theme or type of them, and the catalyst and reactant symbols 18A, 18B would be based on the specific theme of the slot game.

In a fourth step of the present invention, an occurrence of the catalyst symbol 18A in the outcome of the slot game is detected and, and if the catalyst symbol 18A is present within the outcome of the slot game 110, an occurrence of a reactant symbol 18B in one of the cells of the grid 20 which has a predetermined relationship with the catalyst symbol 18A is detected. If a reactant symbol 18B appears in a cell which meets the predetermined relationship, then the reactant symbol 18B is modified into a resultant symbol 18C (see FIG. 4).

In one embodiment, each resultant symbol 18C may affect and modify any adjacent reactant symbol 18B as well. Thus, the method detects an occurrence of a reactant symbol 18B having a predetermined relationship with the resultant symbol 18C and modifying the reactant symbol 18B into another resultant symbol 18C. The catalyst symbol 18A and any resultant symbol(s) 18C form a revised outcome of the slot game (see FIG. 4). The method awards an award (pays a payout) to the player as a function of the revised outcome of the slot game 110 and a second predetermined paytable. The first and second paytable may be the same or different.

In one embodiment, the set of predetermined game symbols includes a wild symbol 18D.

The predetermined relationship between the catalyst symbol 18A (or a resultant symbol 18C) and a reactant symbol 18B, may vary and is a matter of design choice. In one embodiment, a reactant symbol 18B is modified if it is adjacent to a cell containing the catalyst symbol 18A (or a resultant symbol 18C). In another embodiment, any reactant symbol 18B in the outcome of the slot game 110 is modified. In a further embodiment, any reactant symbol 18B in the same column (or reel) as a catalyst symbol 18A (or a resultant symbol 18C) is modified. In a further embodiment, any reactant symbol 18B in the same row as a catalyst symbol 18A (or a resultant symbol 18C) is modified.

In one embodiment of the present invention, in the revised outcome of the slot game 110, the catalyst and resultant symbols 18A, 18C are equivalent to wild symbols in determining any winning payouts.

Figure 4:
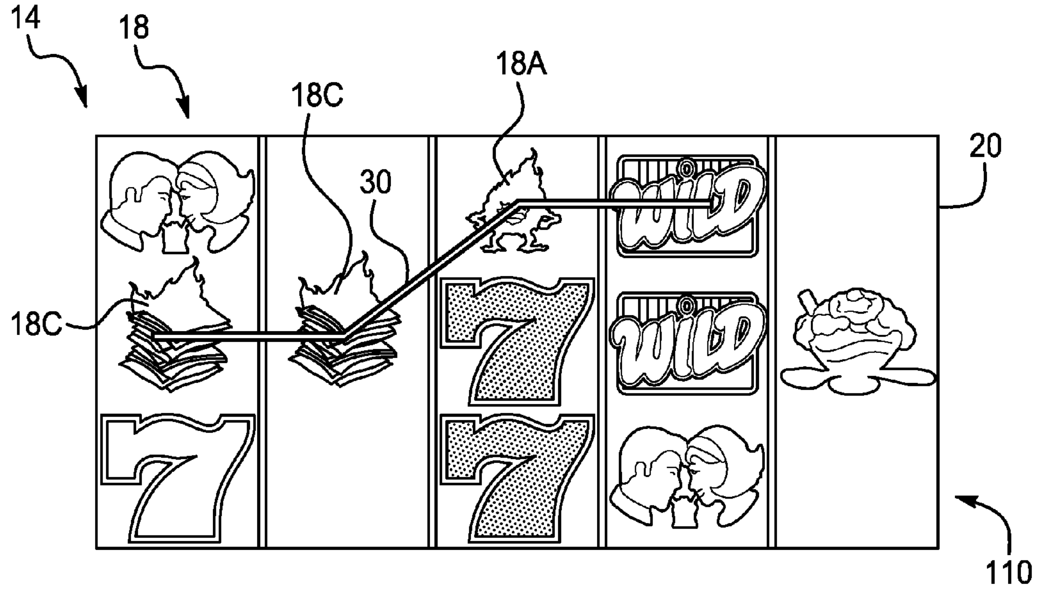
FIG. 4 is a second exemplary screenshot of a video slot game, according to the first embodiment of the present invention.

With respect to the illustrated embodiment of FIGS. 3 and 4, the catalyst symbol 18A is a flame character symbol. The reactant symbol 18B may be a symbol representing an item that is flammable, such as a stack of papers, as shown. The resultant symbol 18C may be the flammable item on fire. With specific reference to FIG. 3, the (initial) outcome of the slot game 110 is shown. Based on the illustrated outcome, there are no winning paylines. However, the outcome includes a catalyst symbol 18A. Thus, the method determines if there are any reactant symbols 18B in a predetermined relationship with the catalyst symbol 18A. In the illustrated embodiment, the predetermined relationship is adjacent, thus any reactant symbol 18B which is adjacent to a catalyst symbol 18A (or a resultant symbol 18C) is modified into a resultant symbol 18C.

In the outcome of the slot game 110 of FIG. 3, there is a catalyst symbol 18A in the top cell of the third column and a reactant symbol 18B adjacent thereto, i.e., in the middle cell of the second column. Thus, this reactant symbol 18B is modified into a resultant symbol 18C (see FIG. 4). The initial outcome also includes a second reactant symbol 18B in the middle of the first column. Since the second reactant symbol 18B is adjacent the resultant symbol 18C in the second column, it is also modified into a resultant symbol 18C.

In the illustrated embodiment, the set of game elements includes a "wild" symbol. Additionally, the catalyst symbol 18A and the resultant symbols 18C are treated as, or are equivalent to, wild symbols. As shown in FIG. 4, the revised outcome includes 4 symbols equivalent to wild symbols on 4 cells of a winning payline 30. Thus, the player is paid a payout for the 4 pay (4 of a kind) on the payline 30.

Figure 5:
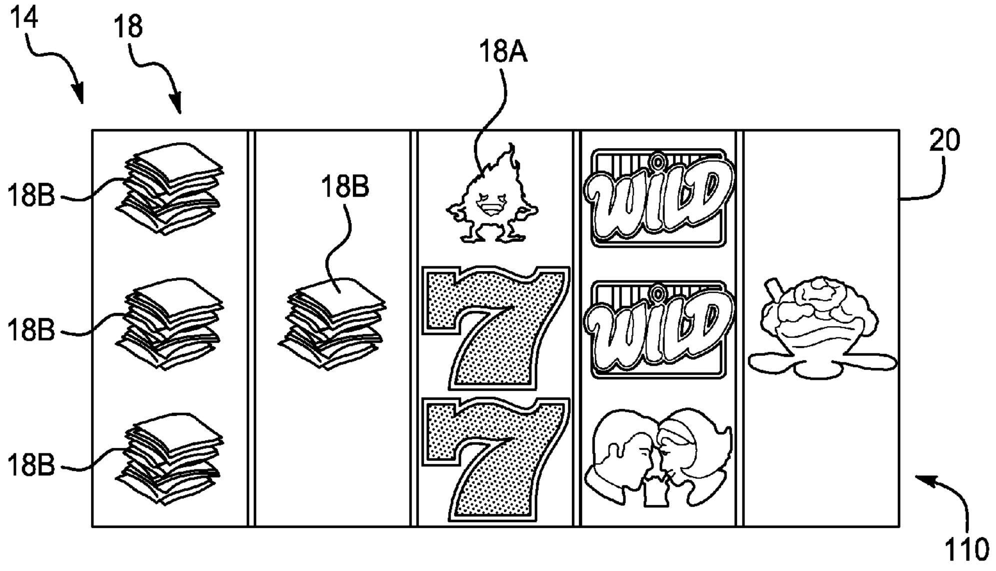
FIG. 5 is a third exemplary screenshot of a video slot game, according to the first embodiment of the present invention.
Figure 6:
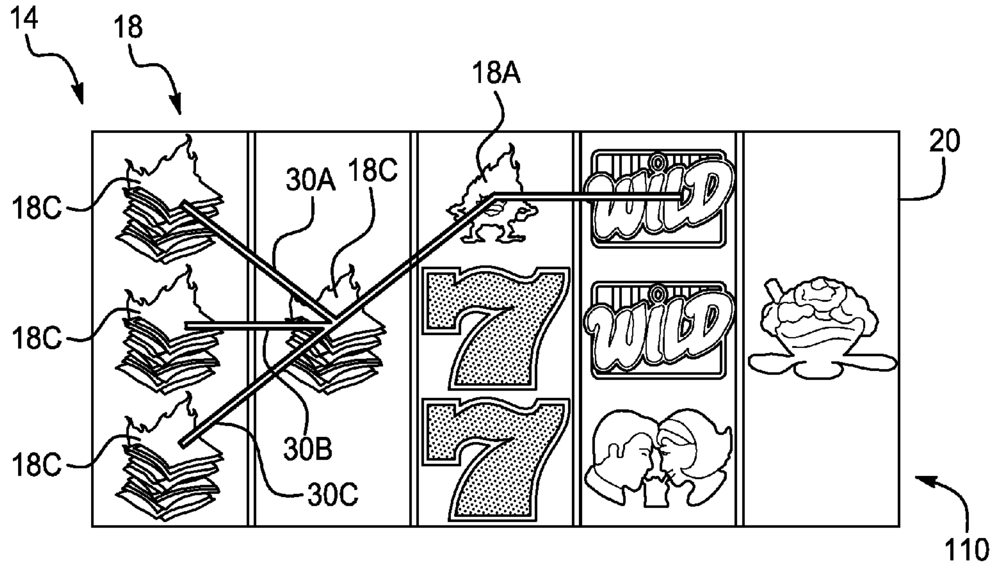
FIG. 6 is a fourth exemplary screenshot of a video slot game, according to the first embodiment of the present invention.

In a second instance of this embodiment shown in FIGS. 5 and 6, the initial outcome of the slot game 110 is the same except that the entire first column includes a reactant symbol 18B. Since these cells are adjacent to the resultant symbol 18C in the second column, they also are modified into resultant symbols 18C (see FIG. 6). Thus, there are 3 potential 4 of a kind pays on paylines 30A, 30B, 30C (paid if the player has played these paylines).

Figure 7:
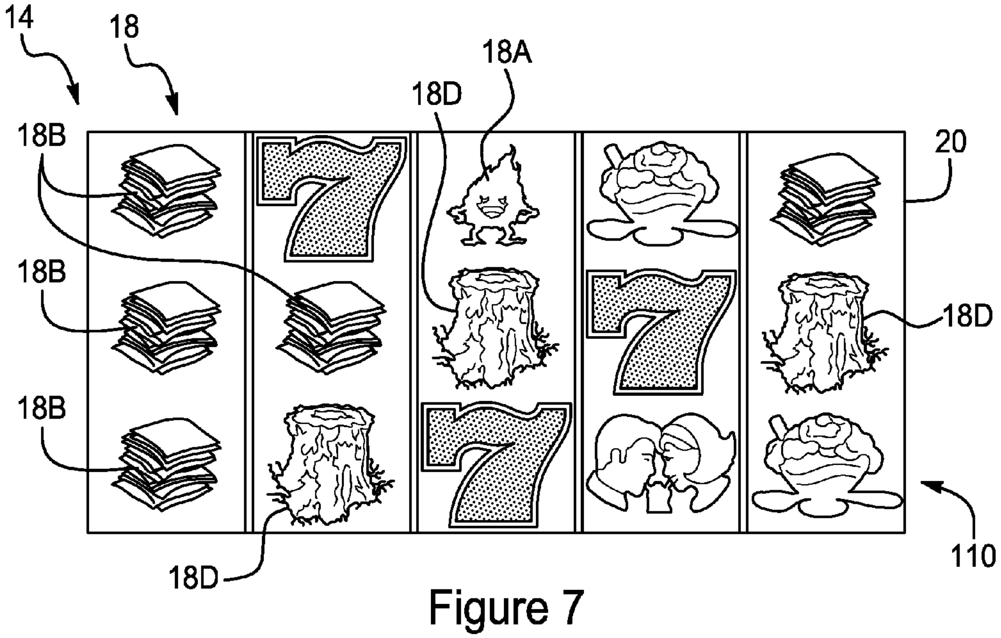
FIG. 7 is a first exemplary screenshot of a video slot game, according to a second embodiment of the present invention.
Figure 8:
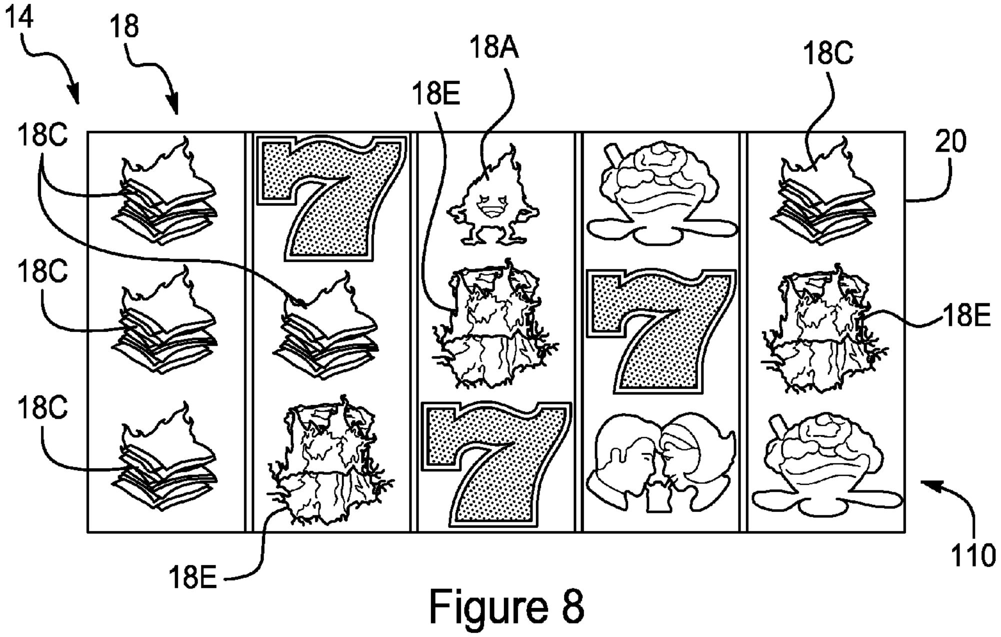
FIG. 8 is a second exemplary screenshot of a video slot game, according to the second embodiment of the present invention.

With reference to FIGS. 7 and 8, in another embodiment the set of games elements includes first and second reactant symbols 18B, 18D. The second reactant symbol 18D may also be modified into a second resultant signal 18E, if it is in a predetermined relationship, e.g., adjacent, same column, same row, or simply in the initial outcome, with the catalyst symbol 18A or a second resultant signal 18E. In the illustrated embodiment, the second reactant symbol 18D is a second flammable item, i.e., a tree stump.

In one aspect of the present invention, the second reactant symbol 18D may not appear very frequently, enhancing the player's excitement of a possible win when it does appear. For example, in FIG. 8, in the revised outcome, multiple second resultant symbols 18E appear, but since there are no winning symbols in the fourth column, the fourth column is effectively blocked and the revised outcome contains no winning patterns.

Figure 9:
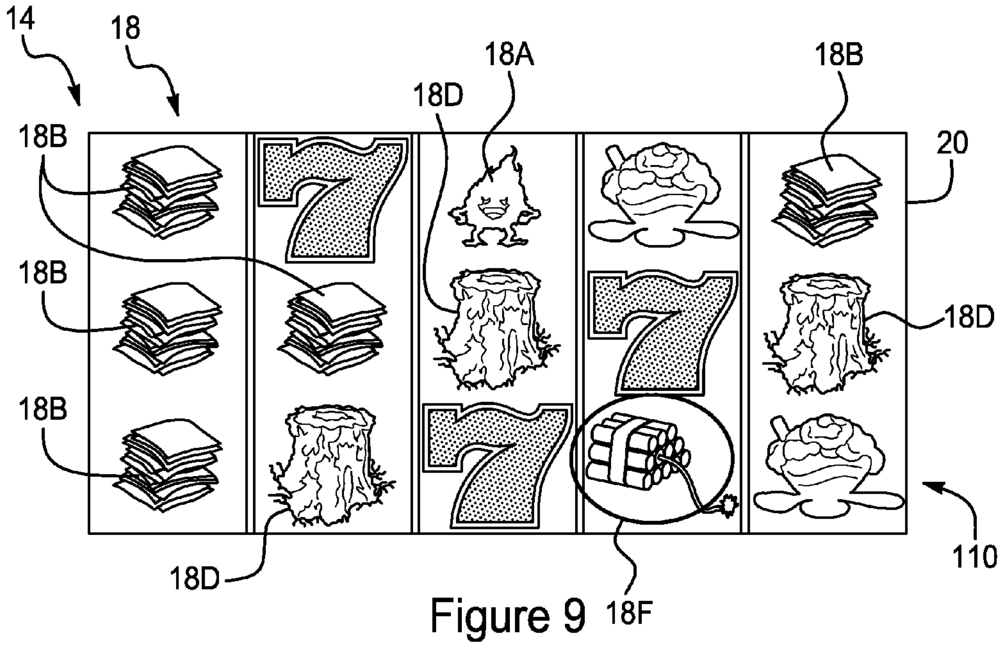
FIG. 9 is a first exemplary screenshot of a video slot game, according to a third embodiment of the present invention.
Figure 10:
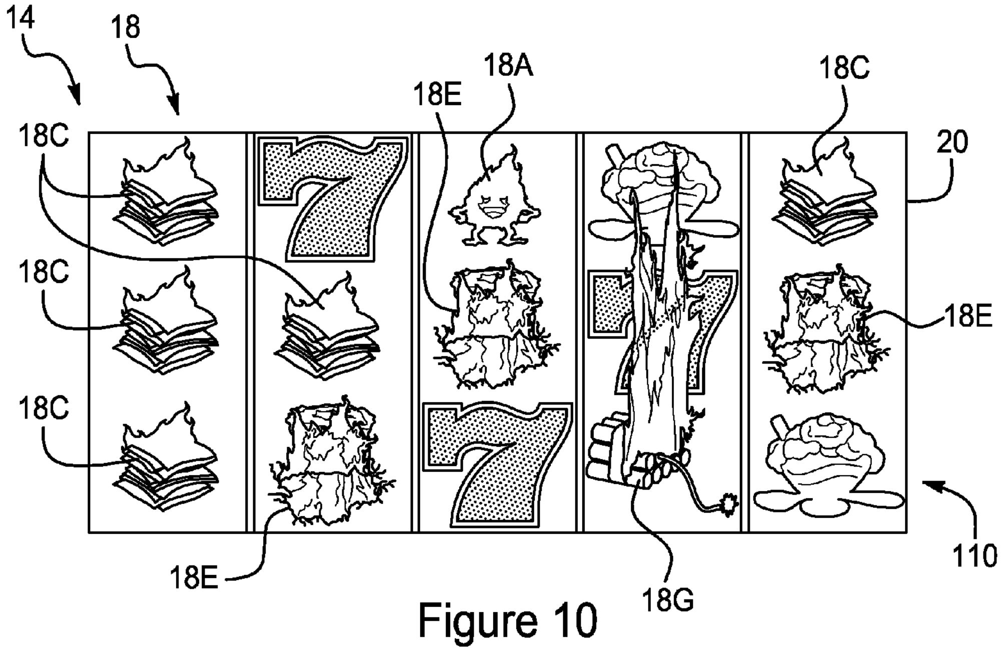
FIG. 10 is a second exemplary screenshot of a video slot game, according to the third embodiment of the present invention.
Figure 11:
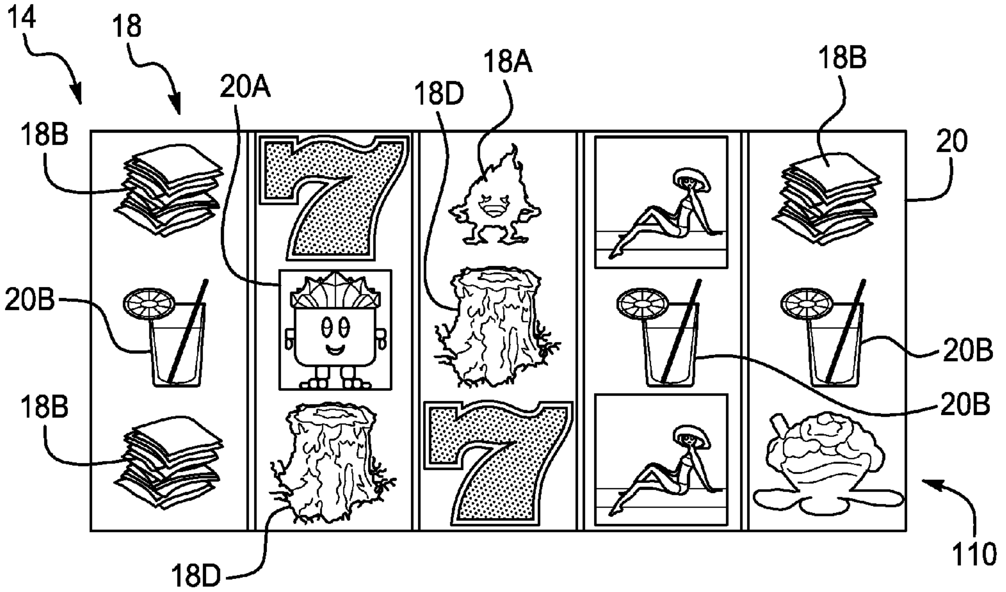
FIG. 11 is a first exemplary embodiment of a video slot game, according to a fourth embodiment of the present invention.
Figure 12:
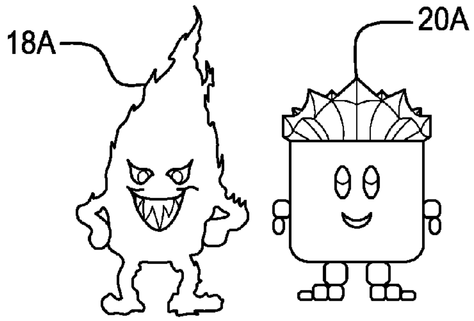
FIG. 12 is an illustration of first and second catalyst symbols of the fourth embodiment of the present invention.

With reference to FIGS. 9 and 10, in another embodiment, the set of game symbols also includes a third reactant symbol 18F (shown as a TNT symbol). The third reactant symbol 18F may also react if it is in a predetermined relationship with the catalyst symbol 18A. In the illustrated embodiment, if the third reactant symbol 18F is adjacent to the catalyst symbol 18A or any resultant symbol 18C, 18E, then it expands modifying the entire row into a resultant symbol 18G or wild (see FIG. 10). In the illustrated instance of FIG. 10, the revised outcome provides multiple 5 of a kind wins.

An exemplary, non limiting paytable is as follows:

| Symbol Name | 3 Symbols | 4 Symbols | 5 Symbols |
|---|---|---|---|
| Paper | 5 | 20 | 100 |
| Fire | 10 | 50 | 250 |

With particular reference to FIGS. 11, 12, 13A, and 13B, in another embodiment of the present invention, the slot game 110 includes first and second catalyst symbols 18A, 20A. In the illustrated embodiment, the first catalyst symbol 18A is the fire character symbol and the second catalyst symbol 20A is an ice character symbol (see FIG. 12). The method detects an occurrence of the first and second catalyst symbols 18A, 20A being adjacent in the outcome of the slot game and responsively. If the first and second catalyst symbols 18A, 20A are adjacent, then there is a brief battle (shown via animations) and one of the catalyst symbols 18A, 20A is established as a winning catalyst symbol. In one aspect of the present invention, the winning catalyst symbol is determined by randomly choosing one of the first and second catalyst symbols 18A, 20A.

In one embodiment of the present invention, the non-winning catalyst symbol 18A, 20A is modified or changed into the winning catalyst symbol.

For the winning catalyst symbol 18A, 20A, any associated reactant symbol 18B, 18D, 18F, 20B which has a predetermined relationship with the winning catalyst symbol 18A, 20A or symbols (or resultant symbol 18C, 18E, 18G, 20C) is modified into an associated resultant symbol 18C, 18E, 18G, 20C.

Figure 13A:
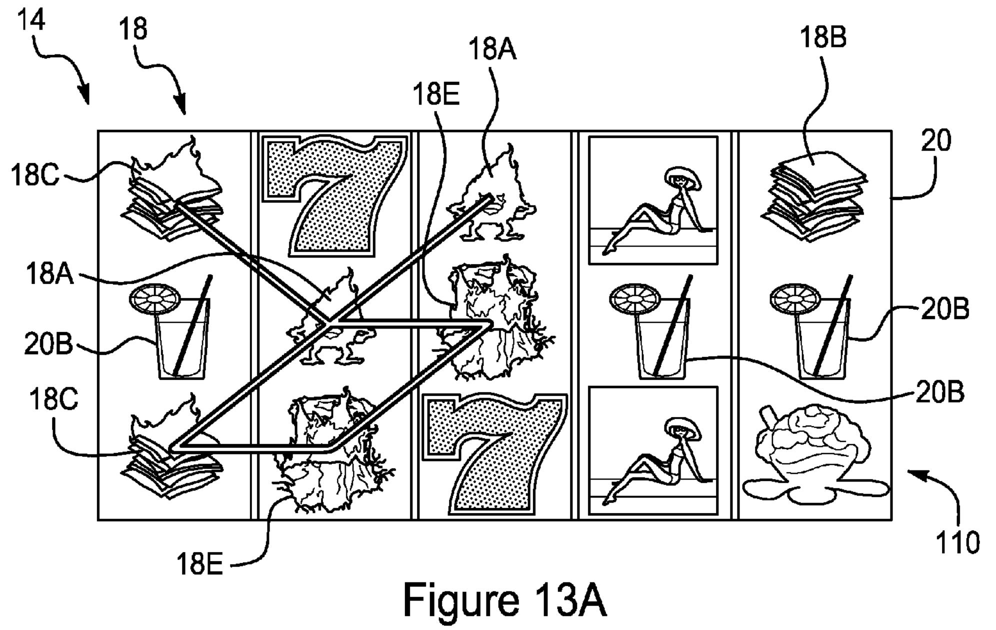
FIG. 13A is a third exemplary embodiment of a video slot game, according to the fourth embodiment of the present invention; and, FIG. 13B is a fourth exemplary embodiment of a video slot game, according to the fourth embodiment of the present invention.

For example, with specific reference to FIG. 13A, the first catalyst symbol 18A is established as the winning catalyst symbol 18A. Thus, in the illustrated embodiment, the second catalyst symbol 20A is modified into the first catalyst symbol 18A. Thereafter, the rules (and variations thereof) discussed above apply, i.e., reactant symbols 18B, 18D, 18F are modified into respective resultant signals and any winning paylines result in an award or payout to the player. In the illustrated example of FIG. 13A, the revised outcome includes multiple 3 of a kind wins.

Figure 13B:
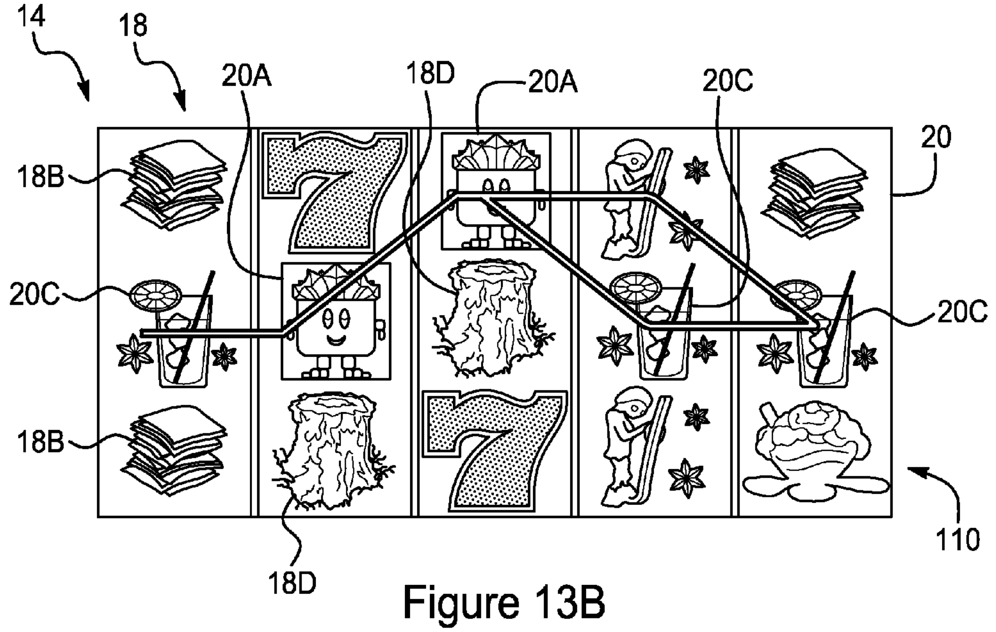

With specific reference to FIG. 13B, if the second catalyst symbol 20A is established as the winning catalyst symbol, the first catalyst symbol 18A is modified into the second catalyst symbol 20A. Thereafter, the rules (and variations thereof) discussed above apply, i.e., reactant symbols 20B are modified into respective associated resultant signals and any winning paylines result in an award or payout to the player. In the illustrated embodiment, the second reactant symbol 20B is a glass of lemonade and the second resultant signal 20C is a glass of lemonade with ice cubes. In the illustrated example of FIG. 13B, the revised outcome includes multiple 5 of a kind wins.

In one aspect of the present invention, the present invention may be used to create excitement for the players. For example, the present invention may be used to first exhibit "near big miss wins", and then via by the features of the present invention provide excitement to provide a second chance for the player to win by modifying any reactant symbols as discussed above.

In the illustrated embodiment, the catalyst and resultant symbols are treated as wild symbols in the revised outcome of the game. However it should be noted that any unmodified reactant symbol may also be treated as a wild symbol. Alternatively, the catalyst symbol(s) and/or the resultant symbol(s) and/or any unmodified reactant symbol may be treated, in the revised outcome of the games, as any other type of symbol with a predetermined function, such as a bonus trigger symbol or a high award symbol.

Other aspect and features of the present invention can be obtained from a study of the drawings, the disclosure, and the appended claims.

What is claimed is:

1. A method of providing a slot game on a gaming machine to a player, the slot game having a plurality of cells arranged in a grid having a plurality of rows and columns, comprising the steps of:

allowing the player to make a wager;

displaying the slot game on a display device of the gaming machine;

randomly selecting an outcome of the slot game and displaying the outcome on the display device, the outcome of the slot game including a game symbol associated with each cell in the grid, the game symbols belonging to a predetermined set of game symbols, the set of game symbols including a catalyst symbol and a reactant symbol;

awarding an award to the player as a function of the outcome of the slot game, the wager made by the player, and a predetermined paytable;

detecting an occurrence of the catalyst symbol in the outcome of the slot game and responsively detecting an occurrence of a reactant symbol in one of the cells of the grid having a predetermined spatial relationship on the grid with the catalyst symbol and responsively modifying the reactant symbol into a resultant symbol if the occurrence of a reactant symbol having a predetermined relationship on the grid with the catalyst symbol has been detected;

for each resultant symbol, detecting an occurrence of a reactant symbol having a predetermined spatial relationship on the grid with the resultant symbol and responsively modifying the reactant symbol into a resultant symbol if the occurrence of a reactant symbol having a predetermined relationship on the grid with the resultant symbol has been detected, the catalyst symbol and any resultant symbol(s) forming a revised outcome of the slot game; and, awarding an award to the player as a function of the revised outcome of the slot game and a second predetermined paytable.

2. A method, as set forth in claim 1, wherein the set of predetermined game symbols includes a wild symbol.

3. A method, as set forth in claim 1, wherein the reactant symbol is modified if it is adjacent to a cell containing the catalyst symbol and/or the resultant symbol.

4. A method, as set forth in claim 1, wherein the catalyst symbol is modified into a resultant or wild symbol.

5. A method, as set forth in claim 1, wherein any reactant symbol in the outcome of the slot game is modified.

6. A method, as set forth in claim 1, including the step of modifying all other symbols in a column containing a resultant symbol into wild symbols.

7. A method, as set forth in claim 1, wherein the resultant symbols are equivalent to wild symbols.

8. A method, as set forth in claim 1, wherein the slot game is a video slot game or stepper slot game.

9. A method, as set forth in claim 1, wherein the predetermined relationship between the between the reactant symbol and the predetermined relationship between the reactive symbol and the resultant symbol is adjacent.

10. A method of providing a slot game on a gaming machine to a player, the slot game having a plurality of cells arranged in a grid having a plurality of rows and columns, comprising the steps of:

allowing the player to make a wager;

displaying the slot game on a display device of the gaming machine;

randomly selecting an outcome of the slot game and displaying the outcome on the display device, the outcome of the slot game including a game symbol associated with each cell in the grid, the game symbols belonging to a predetermined set of game symbols, the set of game symbols including a catalyst symbol and a reactant symbol;

awarding an award to the player as a function of the outcome of the slot game, the wager made by the player, and a predetermined paytable;

detecting an occurrence of the catalyst symbol in the outcome of the slot game and responsively detecting an occurrence of a reactant symbol in one of the cells of the grid having a predetermined relationship with the catalyst symbol and modifying the reactant symbol into a resultant symbol;

for each resultant symbol, detecting an occurrence of a reactant symbol having a predetermined spatial relationship on the grid with the resultant symbol and modifying the reactant symbol into a resultant symbol, the catalyst symbol and any resultant symbol(s) forming a revised outcome of the slot game; and, awarding an award to the player as a function of the revised outcome of the slot game and a second predetermined paytable, wherein the set of game symbols includes a second reactant symbol, the method including the step of detecting an occurrence of the catalyst symbol in the outcome of the slot game and responsively detecting an occurrence of the second reactant symbol in one of the cells of the grid having a predetermined spatial relationship on the grid with the catalyst symbol and modifying the second reactant symbol into a second resultant symbol.

11. A method, as set forth in claim 10, including the step of modifying all other symbols in the same column as the second resultant symbol into third resultant symbols.

12. A method, as set forth in claim 11, wherein the second and third resultant symbols are equivalent to wild symbols.

13. A method of providing a slot game on a gaming machine to a player, the slot game having a plurality of cells arranged in a grid having a plurality of rows and columns, comprising the steps of:

allowing the player to make a wager;

displaying the slot game on a display device of the gaming machine;

randomly selecting an outcome of the slot game and displaying the outcome on the display device, the outcome of the slot game including a game symbol associated with each cell in the grid, the game symbols belonging to a predetermined set of game symbols, the set of game symbols including a first catalyst symbol, a first reactant symbol, a second catalyst symbol, and a second reactant symbol;

awarding an award to the player as a function of the outcome of the slot game, the wager made by the player, and a predetermined paytable;

detecting an occurrence of the first and second catalyst symbols having a predetermined spatial relationship on the grid in the outcome of the slot game and responsively:

randomly choosing one of the first and second catalyst symbols as a winning catalyst symbol;

detecting an occurrence of the associated reactant symbol being in one of the cells of the grid having a predetermined spatial relationship on the grid with the winning catalyst symbol and modifying the associated reactant symbol into a winning resultant symbol;

for each winning resultant symbol, detecting an occurrence of an associated reactant symbol having a predetermined spatial relationship on the grid with the winning resultant symbol and modifying the associated reactant symbol into a winning resultant symbol, the winning catalyst symbol and any winning resultant symbol(s) forming a revised outcome of the slot game; and, awarding an award to the player as a function of the revised outcome of the slot game and a second predetermined paytable.

14. A method, as set forth in claim 13, wherein the predetermined spatial relationship between the first and second catalyst symbols is adjacent.

15. A gaming machine for providing a slot game to a player, the slot game having a plurality of cells arranged in a grid having a plurality of rows and columns, comprising:

a display device;

a game controller for allowing the player to make a wager, displaying the slot game on a display device, randomly selecting an outcome of the slot machine and displaying the outcome on the display device, and awarding an award to the player as a function of the outcome of the slot game, the wager made by the player, and a predetermined paytable, the outcome of the slot game including a game symbol associated with each cell in the grid, the game symbols belonging to a predetermined set of game symbols, the set of game symbols including a catalyst symbol and a reactant symbol, for detecting an occurrence of the catalyst symbol in the outcome of the slot game and responsively detecting an occurrence of a reactant symbol in one of the cells of the grid having a predetermined spatial relationship on the grid with the catalyst symbol and responsively modifying the reactant symbol into a resultant symbol if the occurrence of a reactant symbol having a predetermined relationship on the grid with the catalyst symbol has been detected, and for each resultant symbol, detecting an occurrence of a reactant symbol having a predetermined spatial relationship on the grid with the resultant symbol and responsively modifying the reactant symbol into a resultant symbol if the occurrence of a reactant symbol having a predetermined relationship on the grid with the resultant symbol has been detected, the catalyst symbol and any resultant symbol(s) forming a revised outcome of the slot game and for awarding an award to the player as a function of the revised outcome of the slot game and a second predetermined paytable.

16. A gaming machine, as set forth in claim 15, wherein the set of predetermined game symbols includes a wild symbol.

17. A gaming machine, as set forth in claim 15, wherein the reactant symbol is modified if it is adjacent to a cell containing the catalyst symbol and/or the resultant symbol.

18. A gaming machine, as set forth in claim 15, wherein the catalyst symbol is modified into a resultant or wild symbol.

19. A gaming machine, as set forth in claim 15, wherein any reactant symbol in the outcome of the slot game is modified.

20. A gaming machine, as set forth in claim 15, the game controller for modifying all other symbols in a column containing a resultant symbol into wild symbols.

21. A gaming machine, as set forth in claim 15, wherein the resultant symbols are equivalent to wild symbols.

22. A gaming machine, as set forth in claim 15, wherein the gaming machine is a video slot game or a stepper slot game.

23. A gaming machine, as set forth in claim 15, wherein the predetermined relationship between the between the reactant symbol and the predetermined relationship between the reactive symbol and the resultant symbol is adjacent.

24. A gaming machine for providing a slot game to a player, the slot game having a plurality of cells arranged in a grid having a plurality of rows and columns, comprising:

a display device;

a game controller for allowing the player to make a wager, displaying the slot game on a display device, randomly selecting an outcome of the slot machine and displaying the outcome on the display device, and awarding an award to the player as a function of the outcome of the slot game, the wager made by the player, and a predetermined paytable, the outcome of the slot game including a game symbol associated with each cell in the grid, the game symbols belonging to a predetermined set of game symbols, the set of game symbols including a catalyst symbol and a reactant symbol, for detecting an occurrence of the catalyst symbol in the outcome of the slot game and responsively detecting an occurrence of a reactant symbol in one of the cells of the grid having a predetermined spatial relationship on the grid with the catalyst symbol and modifying the reactant symbol into a resultant symbol and for each resultant symbol, detecting an occurrence of a reactant symbol having a predetermined spatial relationship on the grid with the resultant symbol and modifying the reactant symbol into a resultant symbol, the catalyst symbol and any resultant symbol(s) forming a revised outcome of the slot game and for awarding an award to the player as a function of the revised outcome of the slot game and a second predetermined paytable, wherein the set of game symbols includes a second reactant symbol, the game controller for detecting an occurrence of the catalyst symbol in the outcome of the slot game and responsively detecting an occurrence of the second reactant symbol in one of the cells of the grid having a predetermined spatial relationship on the grid with the catalyst symbol and modifying the second reactant symbol into a second resultant symbol.

25. A gaming machine, as set forth in claim 24, the game controller for modifying all other symbols in the same column as the second resultant symbol into third resultant symbols.

26. A gaming machine, as set forth in claim 25, wherein the second and third resultant symbols are equivalent to wild symbols.

27. A gaming machine for providing a slot game to a player, the slot game having a plurality of cells arranged in a grid having a plurality of rows and columns, comprising:

a display device;

a game controller allowing the player to make a wager, displaying the slot game on a display device, randomly selecting an outcome of the slot machine and displaying the outcome on the display device, and awarding an award to the player as a function of the outcome of the slot game, the wager made by the player, and a predetermined paytable, the outcome of the slot game including a game symbol associated with each cell in the grid, the game symbols belonging to a predetermined set of game symbols, the set of game symbols including a first catalyst symbol, a first reactant symbol, a second catalyst symbol, and a second reactant symbol, for detecting an occurrence of the first and second catalyst symbols having a predetermined spatial relationship on the grid in the outcome of the slot game and responsively: randomly choosing one of the first and second catalyst symbols as a winning catalyst symbol, detecting an occurrence of the associated reactant symbol being in one of the cells of the grid having a predetermined spatial relationship on the grid with the winning catalyst symbol and modifying the associated reactant symbol into a winning resultant symbol and for each winning resultant symbol, detecting an occurrence of an associated reactant symbol having a predetermined spatial relationship on the grid with the winning resultant symbol and modifying the associated reactant symbol into a winning resultant symbol, the winning catalyst symbol and any winning resultant symbol(s) forming a revised outcome of the slot game and awarding an award to the player as a function of the revised outcome of the slot game and a second predetermined paytable.

28. A gaming machine, as set forth in claim 27, wherein the predetermined spatial relationship on the grid between the first and second catalyst symbols is adjacent.

* * * * *